July 19, 1927.
A. THEOPHILEDES
COOKING APPARATUS
Filed Feb. 25, 1927
1,636,393
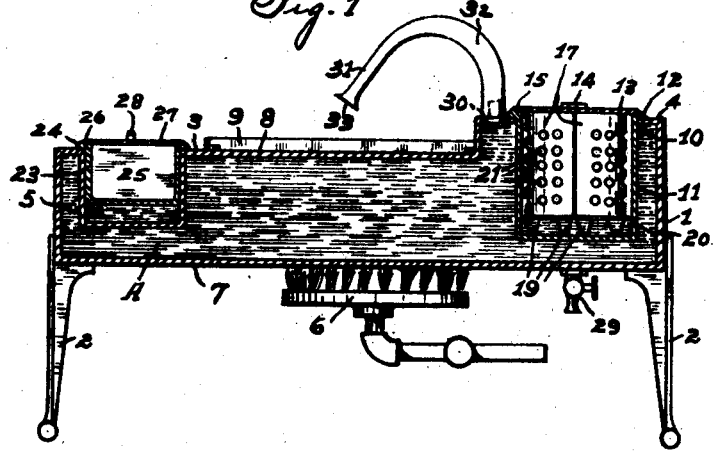
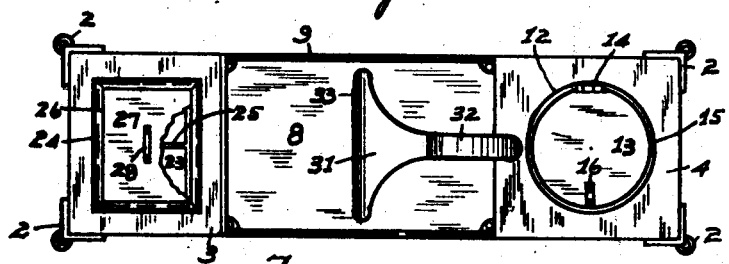
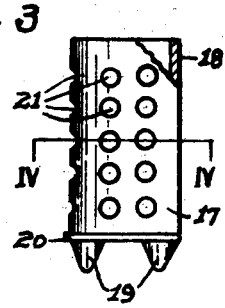
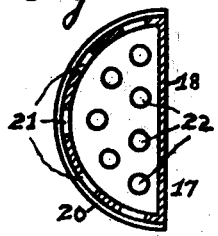
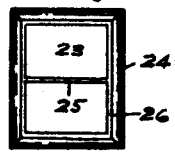
INVENTOR.
Aris Theophiledes
BY Jack R Snyder
ATTORNEY Patented July 19, 1927.

1,636,393

UNITED STATES PATENT OFFICE.

ARIS THEOPHILEDES, OF JEANNETTE, PENNSYLVANIA.

COOKING APPARATUS.

Application filed February 25, 1927. Serial No. 171,028.

My invention relates to a cooking apparatus primarily intended for quick lunch service, and important objects of the invention are to provide a device of the character stated which will efficiently cook the food without attention of the operator and without liability of burning same, and which will maintain the food in a palatable condition for indefinitely prolonged periods of time, under such conditions entirely eliminating the waste attending the operation of other cooking devices of the class stated, which renders the food unfit for consumption if not used within a comparatively short time.

Further objects of the invention are to provide a device of the type set forth, which is simple in its construction and arrangement, strong, durable and efficient in its use, economical in its operation, compact, attractive in appearance and comparatively inexpensive to manufacture and install.

With the foregoing and other objects in view which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

In the drawing wherein like numerals of reference designate corresponding parts throughout the several views:—

Figure 1 is a cross sectional side view of a cooking apparatus constructed in acordance with the invention.

Figure 2 is a top plan view thereof.

Figure 3 is an enlarged side view of the storage basket.

Figure 4 is a sectional view on line IV—IV, Figure 3.

Figure 5 is a top plan view of the food receptacle.

Referring in detail to the drawing 1 denotes a hollow, rectangularly shaped body portion or boiler, which is supported at a suitable working height upon the legs 2. The boiler 1 is constructed from sheet metal and is provided with a top 3 having an elevated portion 4 at one end, and with an integrally formed or permanently fixed tank 5 which is disposed adjacent to the other end thereof and depends into the boiler 1.

A heating element 6, of any suitable construction, is positioned beneath the boiler 1 and acts against the bottom 7 of the latter. as clearly shown in Figure 1. The flat cooking surface 8, of the top 3, is disposed between the tank 5 and the elevated top portion 4, and is provided with a low guard rail 9, which surrounds all sides thereof with the exception of the end side extending along the elevated top portion 4. The cooking surface 8 is used for preparing any food adaptable thereto, particularly wieners, which are intended to be kept on the cooking surface 8 until used.

The elevated top portion 4 is formed with an enlarged opening 10 for the reception of a pot 11. The upper end of the latter is provided with an outwardly disposed annular flange 12 by which the pot 11 is suspended in the opening 10. The pot 11 is spaced from the side walls and bottom of the boiler 1. The pot 11 has a cover 13, which is hinged at its rear end, as at 14, and which seats in an annular recess 15 formed in the top of the flange 12. A handle 16 is fixed to the forward end of the cover 14 to facilitate its manipulation.

A pair of corresponding semi-cylindrical storage baskets 17, having their flat sides 18 positioned against each other, are removably mounted in the pot 11. Each of the baskets 17 is provided with feet 19, which space the former from the bottom of the pot 11. Each of the baskets 17 is further formed with a peripheral flange 20, which spaces the curved side wall of the basket 17 from the wall of the pot 11. The top of the baskets 17 are open and the curved wall and bottom of each is formed with a plurality of perforations, as respectively indicated at 21 and 22. The pot 11 is intended to contain water of a height not exceeding the height of the legs 19 of the baskets 17. The baskets 17 are provided for storing buns and the like, which will be maintained in a fresh and palatable condition, for prolonged periods owing to the spaced relation of the baskets 17 with respect to the pot 11, and by the action of the heated water within the latter.

A receptacle 23 is mounted in the tank 5. The receptacle 23 is provided at its upper end with an outwardly disposed flange 24, by which it is removably suspended in the tank 5. The receptacle 23 is spaced from the boiler side walls and bottom and is preferably transversely divided by an integrally formed partition 25. The receptacle flange 24 is formed with a recess 26 for the reception of a removable cover 27. The latter is provided with a handle 28 to facilitate its manipulation.

The tank 5 is of a greater depth than the receptacle 23 mounted therein, and the space between the bottoms of each is filled with hot water for cooking food placed within the receptacle 23, and for indefinitely maintaining the food therein in an edible condition.

In practice, the boiler 1 is completely or nearly filled with water A, which may be drained therefrom by a drain valve 29 carried by the boiler bottom 7. Water is supplied to the boiler 1 by an inlet tube 30 which is fixed to the top of the elevated portion 4, of the boiler 1. The temperature of the water A is regulated by the adjustment of the heating element 6.

A distributor 31 is communicably connected with the boiler 1, by a goose neck conduit 32, which is pivotally and removably connected with the inlet tube 3. The outlet end 33 of the distributor 31 extends transversely across the boiler cooking surface 8 and is spaced in proximity from the latter.

The distributor 31 is provided for diffusing the steam, emanating from the operation of the boiler 1, over the food on the boiler cooking surface 8, whereby the food, mainly wieners, will be maintained in a fresh, moistened and palatable condition until used. The distributor 31, being pivotally and removably connected with the inlet tube 30, may be shifted to any position permitted by such connection, or may be entirely removed if desired. It will here be noted that the elevated boiler portion 4, virtually constitutes a steam dome with which the steam distributor 31 communicates.

My improved cooking apparatus provides a most efficient economical and convenient device for the purposes stated, and it will be obvious that the construction, arrangement and contour of the boiler 1, pot 11 and receptacle 23 may be widely varied to best meet conditions found in practice without sacrificing any of its advantages or departing from the spirit of the invention.

What I claim is:

1. In combination, a cooking apparatus comprising a boiler containing water, a heating element for said boiler, said boiler provided with a flat cooking surface, cooking receptacles extending into said boiler and spaced from the side walls and bottom of the latter, and a distributor communicating with said boiler for diffusing the steam emanating from the latter over said cooking surface.

2. In a cooking apparatus of the character described, a boiler provided with a flat cooking surface disposed on the top thereof, a portion of said boiler top being elevated above the plane of said cooking surface, a tank permanently connected with said boiler top and depending into said boiler, and a distributor pivotally and removably supported on said elevated portion of said boiler and communicating with the latter for diffusing the steam emanating from said boiler over said cooking surface.

3. In combination, a cooking apparatus of the character described comprising a boiler being adapted for containing water, a heating element for said boiler, means for supporting said boiler, the top of said boiler provided with a flat cooking surface, one end portion of said boiler top being elevated above the plane of said cooking surface and provided with an opening, the other end portion of said boiler top formed to provide a tank depending into said boiler, said tank spaced from the side walls and bottom of said boiler, a cooking receptacle removably mounted in said tank and spaced from the bottom of the latter, a cover for said receptacle, a pot removably mounted in the opening in said elevated portion of the boiler top and spaced from the side walls and bottom of said boiler, a cover for said pot, a distributor pivotally and removably supported on said elevated portion of the boiler top and communicating with said boiler for diffusing the steam emanating from the said boiler over said cooking surface, means for filling said boiler, means for draining said boiler, and a perforated container removably mounted in said pot and spaced from the side walls and bottom of the latter.

In testimony whereof I affix my signature.

ARIS THEOPHILEDES.